United States Patent
Smaus et al.

(10) Patent No.: US 7,213,126 B1
(45) Date of Patent: May 1, 2007

(54) METHOD AND PROCESSOR INCLUDING LOGIC FOR STORING TRACES WITHIN A TRACE CACHE

(75) Inventors: Gregory William Smaus, Austin, TX (US); Raghuram S. Tupuri, Austin, TX (US); Gerald D. Zuraski, Jr., Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 374 days.

(21) Appl. No.: 10/755,742

(22) Filed: Jan. 12, 2004

(51) Int. Cl.
*G06F 9/30* (2006.01)

(52) U.S. Cl. ............... 711/217; 711/3; 711/200; 711/218; 365/230.01; 365/230.03; 712/208; 712/211

(58) Field of Classification Search .......... 711/125, 711/202, 217, 218, 200, 3; 714/45; 365/230.03, 365/230.01; 712/208, 211
See application file for complete search history.

(56) References Cited

U.S. PATENT DOCUMENTS

| | | | |
|---|---|---|---|
| 3,896,419 A | | 7/1975 | Lange et al. |
| 5,210,843 A | * | 5/1993 | Ayers .................. 711/128 |
| 5,381,533 A | | 1/1995 | Peleg |
| 5,930,497 A | * | 7/1999 | Cherian et al. ............ 703/21 |
| 6,167,536 A | * | 12/2000 | Mann ..................... 714/45 |
| 6,185,675 B1 | | 2/2001 | Kranich et al. |
| 6,233,678 B1 | * | 5/2001 | Bala ..................... 712/240 |
| 6,247,121 B1 | | 6/2001 | Akkary et al. |
| 6,256,727 B1 | | 7/2001 | McDonald |
| 6,339,822 B1 | | 1/2002 | Miller |
| 6,345,295 B1 | * | 2/2002 | Beardsley et al. .......... 709/224 |
| 6,357,016 B1 | | 3/2002 | Rodgers et al. |
| 6,449,714 B1 | | 9/2002 | Sinharoy |
| 6,578,128 B1 | * | 6/2003 | Arsenault et al. ........... 711/202 |
| 6,823,428 B2 | | 11/2004 | Rodriguez et al. |
| 6,973,543 B1 | * | 12/2005 | Hughes ................ 711/141 |
| 7,003,629 B1 | * | 2/2006 | Alsup ................... 711/118 |
| 2002/0144101 A1 | | 10/2002 | Wang et al. |

(Continued)

FOREIGN PATENT DOCUMENTS

EP        0 957 428        11/1999

(Continued)

OTHER PUBLICATIONS

Yuan Chou, et al., "Instruction Path Coprocessors," Mar. 2000, pp. 1-24.

(Continued)

*Primary Examiner*—Stephen C. Elmore
*Assistant Examiner*—Daniel Kim
(74) *Attorney, Agent, or Firm*—Robert C. Kowert; Meyertons, Hood, Kivlin, Kowert & Goetzel, P.c.

(57) ABSTRACT

A processor includes a trace cache memory coupled to a trace generator. The trace generator may be configured to generate a plurality of traces each including one or more operations that may be decoded from one or more instructions. Each of the operations may be associated with a respective address. The trace cache memory is coupled to the trace generator and includes a plurality of entries each configured to store one of the traces. The trace generator may be further configured to restrict each of the traces to include only operations having respective addresses that fall within one or more predetermined ranges of contiguous addresses.

18 Claims, 6 Drawing Sheets

U.S. PATENT DOCUMENTS

| | | |
|---|---|---|
| 2003/0023835 A1 | 1/2003 | Kalafatis et al. |
| 2004/0083352 A1 | 4/2004 | Lee |
| 2004/0143721 A1 | 7/2004 | Pickett et al. |
| 2004/0193857 A1 | 9/2004 | Miller et al. |
| 2004/0216091 A1* | 10/2004 | Groeschel ............... 717/128 |
| 2005/0125613 A1* | 6/2005 | Kim et al. ............... 711/125 |
| 2005/0125632 A1 | 6/2005 | Alsup et al. |

FOREIGN PATENT DOCUMENTS

| | | |
|---|---|---|
| GB | 2 281101 | 4/2003 |

OTHER PUBLICATIONS

Friendly, et al., "Putting the Fill Unit to Work: Dynamic Organizations for Trace Cache Microprocessors," Dept. of Electrical Engineering and Computer Science, The Univ. of Michigan, Dec. 1998, 9 pages.

Bryan Black, et al., "Turboscalar: A High Frequency High IPC Microarchitecture," Dept. of Electrical and Computer Engineering, Carnegie Mellon Univ., Jun. 2000, pp. 1.

Merten, et al., "An Architectural Framework for Run-Time Optimization," Jun. 2001, pp. 1-43.

Jourdan, et al., "Increasing the Instruction-Level Parallelism through Data-Flow Manipulation," Intel, 11 pages.

Hinton, G., et al., "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel, et al., "replay: A Hardware Framework for Dynamic Optimization," IEEE, vol. 50, No. 6, Jun. 2001, pp. 590-608.

Jacobson, et al., "Instruction Pre-Processing in Trace Processors," IEEE Xplore, Jan. 1999, 6 pages.

Bryan Black, et al., "The Block-Based Trace Cache," IEEE, 1999, pp. 196-207.

Rotenberg, et al., "Trace Cache: a Low Latency Approach to High Bandwidth Instruction Fetching," IEEE, 1996, pp. 24-34.

Grant Braught, "Clas #21-Assemblers, Labels & Pseudo Instructions," Dickenson College, Fall Semester 2000, 6 pages.

Patterson, et al., "Computer Architerture A Quantitative Approach," Second Edition, Morgan Kaufmann Publishers, Inc., 1996, pp. 271-278.

Palmer, et al., "Fido: A Cache That Learns to Fetch," Proceedings of the 17th International Conference on Very Large Data Bases, Barcelona, Sep. 1991, pp. 255-264.

Chen et al., "Eviction Based Cache Placement for Storage Caches," USENIX 2003 Annual Technical Conference, (13 pages).

* cited by examiner

METHOD AND PROCESSOR INCLUDING LOGIC FOR STORING TRACES WITHIN A TRACE CACHE

BACKGROUND OF THE INVENTION

1. Field of the Invention

This invention is related to the field of processors, and more particularly, to probing a trace cache within a processor.

2. Description of the Related Art

Instructions processed in a processor are encoded as a sequence of ones and zeros. For some processor architectures, instructions may be encoded with a fixed length, such as a certain number of bytes. For other architectures, such as the x86 architecture, the length of instructions may vary. The x86 processor architecture specifies a variable length instruction set (i.e., an instruction set in which various instructions are each specified by differing numbers of bytes). For example, the 80386 and later versions of x86 processors employ between 1 and 15 bytes to specify a particular instruction. Instructions have an opcode, which may be 1–2 bytes, and additional bytes may be added to specify addressing modes, operands, and additional details regarding the instruction to be executed.

In some processor architectures, each instruction may be decoded into one or more simpler operations prior to execution. Decoding an instruction may also involve accessing a register renaming map in order to determine the physical register to which each logical register in the instruction maps and/or to allocate a physical register to store the result of the instruction.

Instructions may be fetched into the decode portion of a processor based, in part, on branch predictions made within the processor. In general, the bandwidth of the instruction fetch and decode portions of a processor may determine whether the execution cores are fully utilized during each execution cycle. Accordingly, it is desirable to be able to provide enough bandwidth in the instruction fetch and decode portions of the processor to keep the execution core as fully supplied with work as possible.

Most processors employ one or more cache memories for storing frequently or recently used information. Typical caches, such as an L1 or L2 cache, for example, may be organized as a collection of blocks of memory that are referred to as cache lines. Cache lines may be easily stored and accessed since they are aligned, contiguous blocks of memory. Generally speaking, when a cache line must be invalidated, it may be a simple process of comparing a probe address to the physical address in the cache tags of all cache lines at indices that could be holding the probe's data. The list of cache indices simply comes from the probe address bits that correspond to the cache index bits.

Later generation processors typically use some form of trace cache for caching instructions that have been decoded into operations that are commonly referred to as micro-ops. Trace caches may store streams of decoded instructions or 'traces'. There is generally no requirement that these instructions be sequential and the first instruction in the trace is not necessarily aligned on any particular boundary. Thus, it may be problematic to invalidate trace cache entries corresponding to a given probe address.

SUMMARY

Various embodiments of a method for storing traces within a trace cache of a processor are disclosed. In one embodiment, a processor is contemplated, which includes a trace cache memory coupled to a trace generator. The trace generator may be configured to generate a plurality of traces each including one or more operations that may be decoded from one or more instructions. Each of the operations may be associated with a respective address. The trace cache memory is coupled to the trace generator and includes a plurality of entries each configured to store one of the traces. The trace generator may be further configured to restrict each of the traces to include only operations having respective addresses that fall within one or more predetermined ranges of contiguous addresses.

In one specific implementation, a starting address of the one or more predetermined ranges of contiguous addresses may be based upon the respective address of a given one of the one or more operations within each of the plurality of traces. In one such implementation, the starting address of the one or more predetermined ranges of contiguous addresses may be based upon the respective address of a first operation within each of the traces.

In another specific implementation, each of said one or more predetermined ranges of contiguous addresses is separated by a predetermined number of contiguous addresses.

In another implementation, the one or more predetermined ranges of contiguous addresses includes a first range of contiguous addresses as determined by the respective address of a given one of the operations and a next N sequential ranges of contiguous addresses, where N is any number.

In still another specific implementation, the one or more predetermined ranges of contiguous addresses includes a first range of contiguous addresses as determined by the respective address of a given one the operations and a next sequential range of contiguous addresses.

In another embodiment, a method for storing traces within a trace cache of a processor includes generating a trace including one or more operations decoded from one or more instructions. Each of the operations may be associated with a respective address. The method further includes storing the trace in a trace cache entry within a trace cache memory. However, the method further includes restricting each of the traces to include only operations having respective addresses that fall within one or more predetermined ranges of contiguous addresses.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Figure 1:
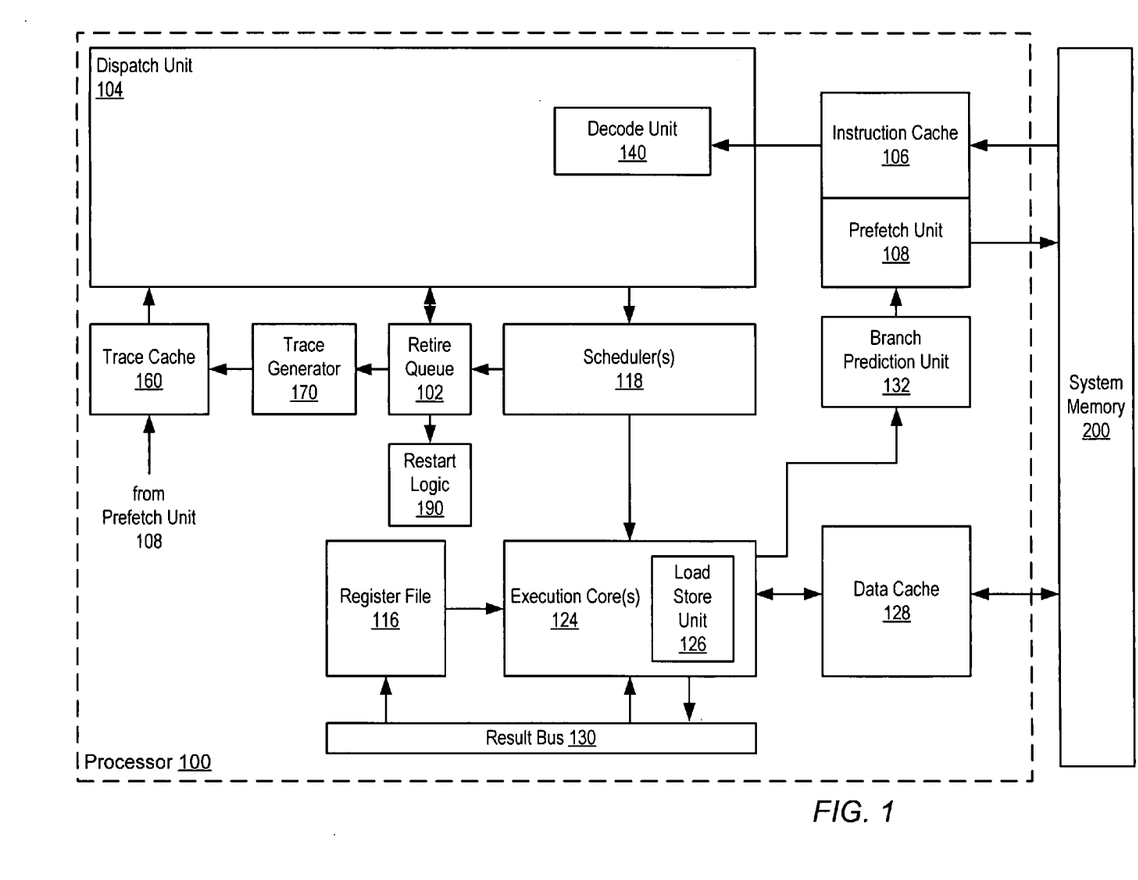
FIG. 1 is a block diagram of one embodiment of a processor.

Turning now to FIG. 1, a block diagram of one embodiment of a processor is shown. Processor 100 may be designed to be compatible with the x86 architecture. Processor 100 is configured to execute instructions stored in a system memory 200. Many of these instructions operate on data stored in system memory 200. System memory 200 may be physically distributed throughout a computer system and may be accessed by one or more processors 100.

In the illustrated embodiment, processor 100 includes an instruction cache 106 and a data cache 128. Processor 100 also includes a prefetch unit 108 coupled to system memory 200. Prefetch unit 108 may prefetch instruction code from system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache 106 and traces from trace cache 160 into a dispatch unit 104. Instructions may be fetched from instruction cache 106 in response to a given instruction address missing within trace cache 160. Likewise, instructions may be fetched from system memory 200 in response to a given address missing within instruction cache 106.

Dispatch unit 104 may be configured to receive instructions from instruction cache 106 and to receive decoded and/or partially decoded operations from trace cache 160. Dispatch unit 104 may include a decode unit 140 for decoding instructions received from instruction cache 106. Dispatch unit 104 may also include a microcode unit (not shown) for use when handling microcoded instructions.

The dispatch unit 104 is configured to dispatch operations to scheduler(s) 118. In one embodiment, one or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to a register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may decode certain instructions into one or more operations executable within execution core(s) 124. Simple instructions may correspond to a single operation while more complex instructions may correspond to multiple operations. Upon receiving an operation that involves the update of a register, the dispatch unit 104 may reserve a register location within register file 116 to store speculative register states. It is noted that in an alternative embodiment, a reorder buffer (not shown) may be used to store one or more speculative register states for each register. A register map 134 may translate logical register names of source and destination operands to physical register names in order to facilitate register renaming. Register map 134 may track which registers within register file 116 are currently allocated and deallocated.

When operations are handled by dispatch unit 104, if a required operand is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a destination operand for an operation. Register file 116 may have one or more previously allocated physical registers assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 116) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

In one embodiment, processor 100 supports out of order execution. A retire queue 102 (or, alternatively, a reorder buffer) may keep track of the original program sequence for register read and write operations, allow for speculative instruction execution and branch misprediction recovery, and facilitate precise exceptions. In one embodiment, retire queue 102 may function similar to a reorder buffer, but may not provide any data value storage. In an alternative embodiment, retire queue 102 may provide data value storage for speculative register states and also support register renaming and thus may function more like a reorder buffer. In one embodiment, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Retire queue 102 may also provide signals identifying program traces to trace generator 170. Trace generator 170 may also be referred to as a fill unit. Trace generator 170 may store traces identified by retire queue 102 into trace cache 160. Each trace within trace cache 160 may include operations that are part of several different basic blocks. A basic block is a set of operations that begins just after a branch operation and ends with another branch operation, such that if any one of the operations in a basic block is executed, all of the operations in that basic block will be executed.

As will be described in greater detail below in conjunction with the descriptions of FIG. 2 through FIG. 5, in one embodiment trace cache 160 may include a plurality of locations for storing trace cache entries. The traces stored into trace cache 160 may include several decoded or partially decoded operations. As used herein, a "trace" is a group of operations that are stored within a single trace cache entry in the trace cache 160. Trace generator 170 may also be configured to restrict the set of operations that are stored in a given trace based upon the address associated with each operation. In addition, in one embodiment processor 100 may include trace cache control logic (not shown in FIG. 1) that may be configured to provide control over the probing of trace cache 160.

Prefetch unit 108 may fetch operations from trace cache 160 into dispatch unit 104. When operations are fetched from the trace cache (as opposed to when instructions are loaded from instruction cache 106), the decode unit 140 may be at least partially bypassed, resulting in a decreased number of dispatch cycles for the cached operations. Accordingly, the trace cache 160 may allow the dispatch unit 104 to amortize the time taken to partially (or fully) decode the cached operations in decode unit 140 over several execution iterations if traces are executed more than once.

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In one embodiment, each scheduler 118 may not provide operand value storage. Instead, each scheduler may monitor issued operations and results available in register file 116 in order to determine when operand values will be available to be read by execution core(s) 124 (from register file 116 or result bus 130). In one embodiment, each scheduler 118 may be associated with a dedicated execution core 124. In another embodiment, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect.

In one embodiment, each of the execution core(s) 124 may include components configured to perform integer arithmetic operations of addition and subtraction, as well as shifts, rotates, logical operations, and branch operations. A floating-point unit may also be included to accommodate floating-point operations. One or more of the execution core(s) 124 may be configured to perform address generation for load and store memory operations to be performed by load/store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. In such situations, the results of instructions in the original program sequence that occurred after the mispredicted branch instruction may be discarded, including those which were speculatively executed and temporarily stored in load/store unit 126 and/or register file 116.

Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information for pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

It is noted that processor 100 may also include and/or be coupled to other components in addition to those shown here. For example, additional levels of cache such as an L2 cache, for example, may be included (internal and/or external to processor 100) between processor 100 and system memory 200. Similarly, processor 100 may include a memory controller configured to control system memory 200 in some embodiments. Additionally, the interconnections between logical components may vary between embodiments.

Trace Cache

Figure 2:
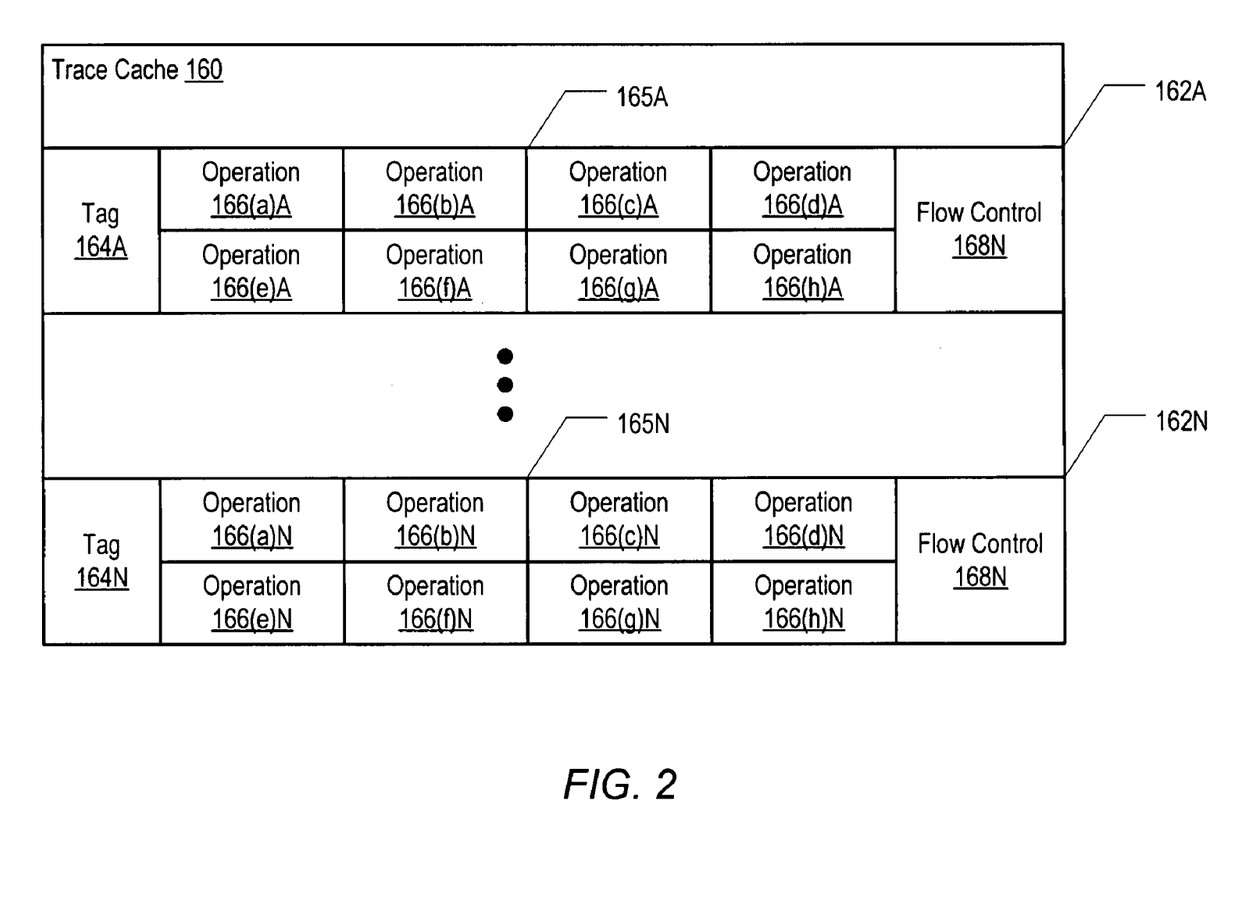
FIG. 2 is a block diagram of one embodiment of a trace cache of the processor of FIG. 1.

Referring to FIG. 2, one embodiment of an exemplary trace cache of FIG. 1 is shown. Trace cache 160 of FIG. 2 includes several entries designated 162A through 162N, where N may be any number. As described further below, each trace cache entry 162 may store a trace that includes one or more decoded instructions 165 or operations. Since there is no requirement that the decoded instructions be stored sequentially, the decoded instructions 165 in a trace may not be stored in program order. For example, a given entry 162 may store both a branch instruction and the instruction that is the destination of the branch when the branch is taken (as opposed to the instruction that follows the branch in program order). In some embodiments, the decoded instructions 165 in each trace cache entry 162 may be stored in at least partially decoded form. As used herein, the term "trace" refers to a group of operations decoded from one or more instructions stored in a single trace cache entry 162.

In the illustrated embodiment, a trace cache entry 162 may store up to eight component operations included in a group of decoded and/or partially decoded instructions in operation storage units 166(a)–166(h). Note that other embodiments may include fewer or additional operation storage units 166, allowing storage of different numbers of operations within each trace cache entry 162.

Certain operation storage units 166 within a trace cache entry 162 may be reserved for certain types of operations. For example, in one embodiment, a portion of the operation storage units (e.g., 166(a)–166(d)) may be used to store memory operations. Similarly, another portion of the operation storage units (e.g., 166(e)–166(h)) may be used to store data operations. It is noted that other embodiments may associate certain types of operations with certain operation storage units differently (or not at all).

In addition to including several operation storage units 166, each trace cache entry 162 also includes an identifying tag 164 and flow control information 168. Tag 164 may be similar to a tag in instruction cache 106, allowing prefetch unit 108 to determine whether a given operation hits or misses in trace cache 160. For example, tag 164 may include all or some of the address bits identifying the address of the earliest instruction within a given trace. (e.g., the tag may include the address of the earliest instruction, in program order, stored within that trace). In another embodiment, the tag may include enough information that the address of each instruction (or at least the first instruction within each trace) may be independently identified using the information stored in the trace.

In the illustrated embodiment, each trace may also include up to two branch instructions. Other embodiments may include fewer or additional branch instructions within each trace. Flow control information 168 may include a label (not shown) for each branch instruction included within the trace. The label may be an indication identifying the address to which control should branch depending on the resolution (taken, not taken) of a respective branch. Thus, each item of flow control information 168 may be associated with a particular branch operation. For example, in one embodiment, one flow control information storage location within a trace may be associated with the first branch operation in the trace and the other flow control information storage location may be associated with the second branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166.

Probing a Trace Cache for Invalidation

As mentioned previously, there may be limited information about instruction boundaries within a trace. For example, if instructions are partially decoded into their component operations prior to storage in a trace, no information delineating the different instructions in that trace may be included in the trace. Furthermore, if after being decoded, component operations of different instructions are combined, reordered, and/or modified, it may be even more difficult to identify instruction boundaries. Consequentially, invalidating trace cache entries corresponding to a trace cache probe address may be difficult.

Figure 3:
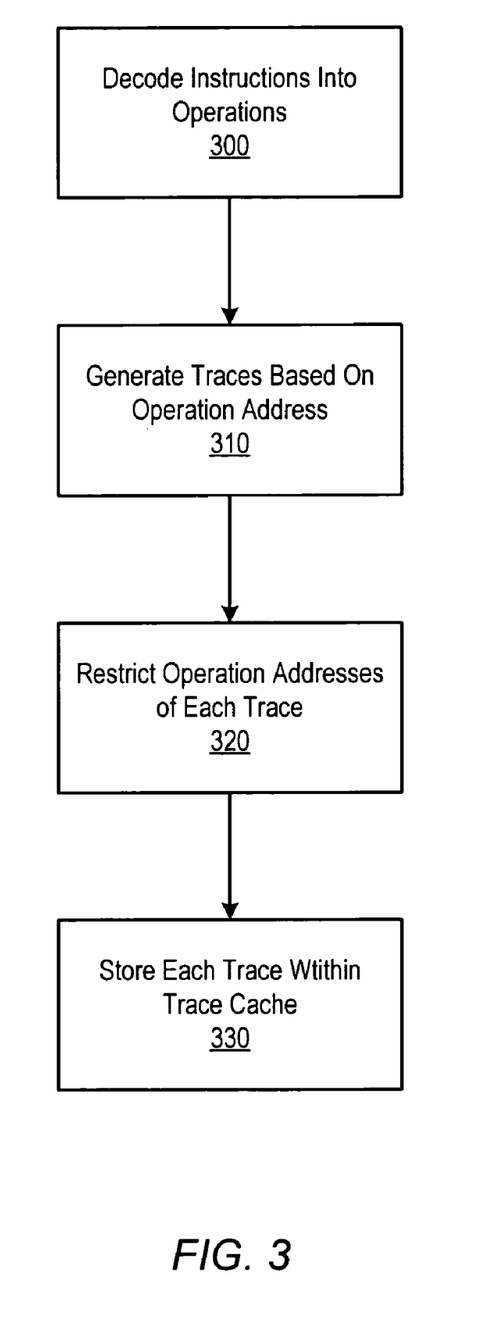
FIG. 3 a flow diagram describing operation of one embodiment of the trace cache logic of the processor of FIG. 1.

Turning to FIG. 3, a flow diagram describing operation of one embodiment of trace cache logic of processor 100 is shown. Beginning in block 300, as described above, instructions may be fully or partially decoded into their component operations by decode unit 140. As retire queue 102 provides the operations to trace generator 170, trace generator 170 may generate traces including one or more of the operations. During the generation process, trace generator may group the operations based upon the respective addresses of the operations (block 310). To simplify probing trace cache 160, trace generator 170 may restrict which instructions or operations may be stored together in a single trace. In one embodiment, trace generator 170 may restrict each trace to include only operations having respective addresses that fall within one or more predetermined ranges of contiguous addresses (block 320). For example, instructions or operations that come from the same contiguous and/or aligned unit of memory defined by the first instruction in the trace and instructions or operations that come from the next N sequential contiguous and/or aligned unit of memory may be stored together in the same trace. In one embodiment, N may be one, although other embodiments are contemplated in which N may be any number of sequential contiguous and/or aligned units of memory. Each trace generated in this way may then be stored within trace cache 160 (block 330).

In the embodiments described above, no additional tag storage may be necessary since reasonable sizes of the contiguous and/or aligned units of memory may be much smaller than a physical page (e.g., <<4 KB). Instead, the physical tag of the first instruction may be incremented to obtain the next sequential contiguous and/or aligned unit. However, in cases where the trace cache entry is in the last contiguous and/or aligned unit of memory in a physical page, a simple increment of the physical tag may not yield the address of the next sequential contiguous and/or aligned unit of memory due to paging in a virtual memory system. In such cases, extra tag storage may be necessary to store additional address tags for the next sequential contiguous and/or aligned unit of memory that crosses the page boundary. Although these entries having the extra tag storage may be grouped together since the high-order index bits may all have a value of one.

A trace cache such as trace cache 160 containing traces constructed as described above may be probed by searching the trace cache entries that have index bits in common with the probe address. In one embodiment, if there are trace cache index bits below the granularity of the probe address, those trace cache index bits may be unspecified and all corresponding trace cache indices are searched. Since the instructions from the next sequential contiguous and/or aligned unit of memory are allowed to be stored within a trace, the probe address is decremented by the size of the contiguous and/or aligned unit of memory and the trace cache indices specified by that address must be searched. Similarly, the probe address is decremented when compared against the tags of these trace cache indices. If the probe is to the first contiguous and/or aligned unit of memory, then the decremented probe address wraps in the trace cache from the first set of indices to the last set of indices. In addition, due to paging, the extra tags are used in the comparison and not the trace cache tags. Since some traces may not contain instructions from the next contiguous and/or aligned unit of memory, a bit may be used to identify those trace cache entries. Thus, when one of those entries is probed on behalf of a decremented probe address, the bit may be used to determine that there is no need to perform an invalidation.

In another embodiment, the predetermined range of addresses may include two or more distinct address ranges separated by a predetermined number of addresses. In such an embodiment, a first contiguous and/or aligned unit of memory having a first predetermined address range may be defined starting with the address of the first instruction in the trace. Then, a second contiguous and/or aligned unit of memory having a second predetermined address range may be defined at some predetermined number of addresses away from the first range. Further, additional contiguous and/or aligned units of memory having a additional predetermined address ranges may be defined at some predetermined number of addresses away from the second and subsequent address ranges.

Performing probe comparisons and invalidations, if needed, may take a significant amount of time. As described below, processor 100 includes a mechanism that allows trace cache fetching to continue, unless the fetch address matches the probe address or the modified probe address.

Figure 4:
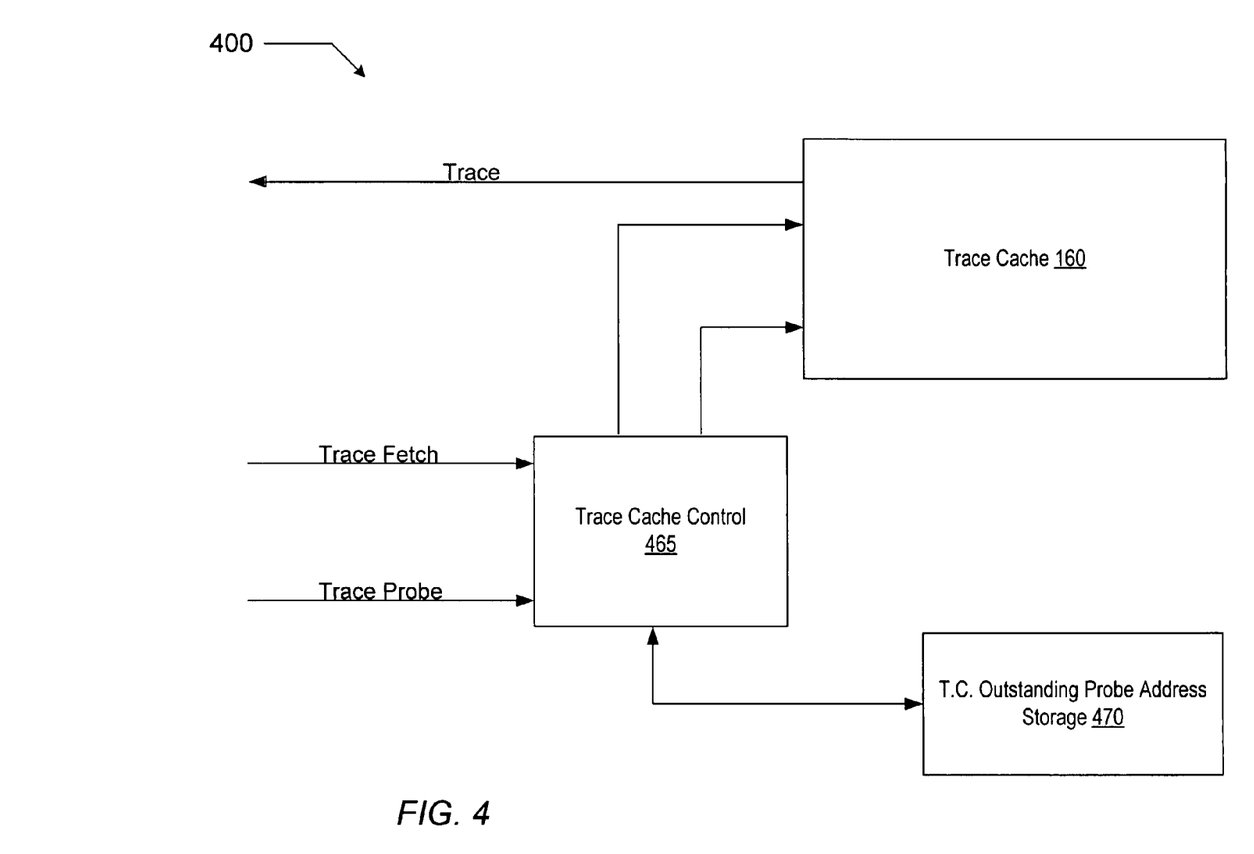
FIG. 4 is a block diagram of one embodiment of a trace cache subsystem.

Referring to FIG. 4, a block diagram of one embodiment of a trace cache subsystem 400 is shown. Components corresponding to those shown in FIG. 1 and FIG. 2 are numbered identically for clarity and simplicity. Trace cache subsystem 400 includes trace cache 160 coupled to a trace cache control unit 465. Trace cache subsystem 400 also includes a trace cache probe storage 470 that is coupled to trace cache control unit 465.

Trace cache control unit 465 is configured to receive a trace cache probe and to store the address associated with the probe into trace cache probe storage 470. The probe address may remain stored within trace cache probe storage 470 (and is thus referred to as an outstanding probe address) until the probe completes. In one embodiment, in response to receiving a trace fetch, trace cache control unit 465 may compare the address associated with the trace fetch to the address stored within trace cache probe storage 470. If the trace fetch address matches the outstanding probe address, trace cache control unit 46 may block or "hold off" that fetch to allow the probe to complete. However, if the trace fetch does not match the outstanding probe address, trace cache control unit 46 may allow the trace fetch to proceed. In response to allowing the fetch to proceed, trace cache control unit 465 may provide the trace fetch request to trace cache 160. Trace cache 160 may subsequently provide the requested trace to the requester. Hence probe reads/invalidates may use spare cycles that are not used by the trace fetcher.

In one embodiment, trace cache probe storage 470 may be a storage suitable for storing one outstanding probe address. However, in other embodiments, trace cache probe storage 470 may be a storage suitable for storing a plurality of probe addresses. In any embodiment, trace cache probe storage 470 may be implemented using a variety of storage mechanisms such as a hardware register set, a probe address table in a RAM structure or some other suitable storage structure, for example.

Exemplary Computer Systems

Figure 5:
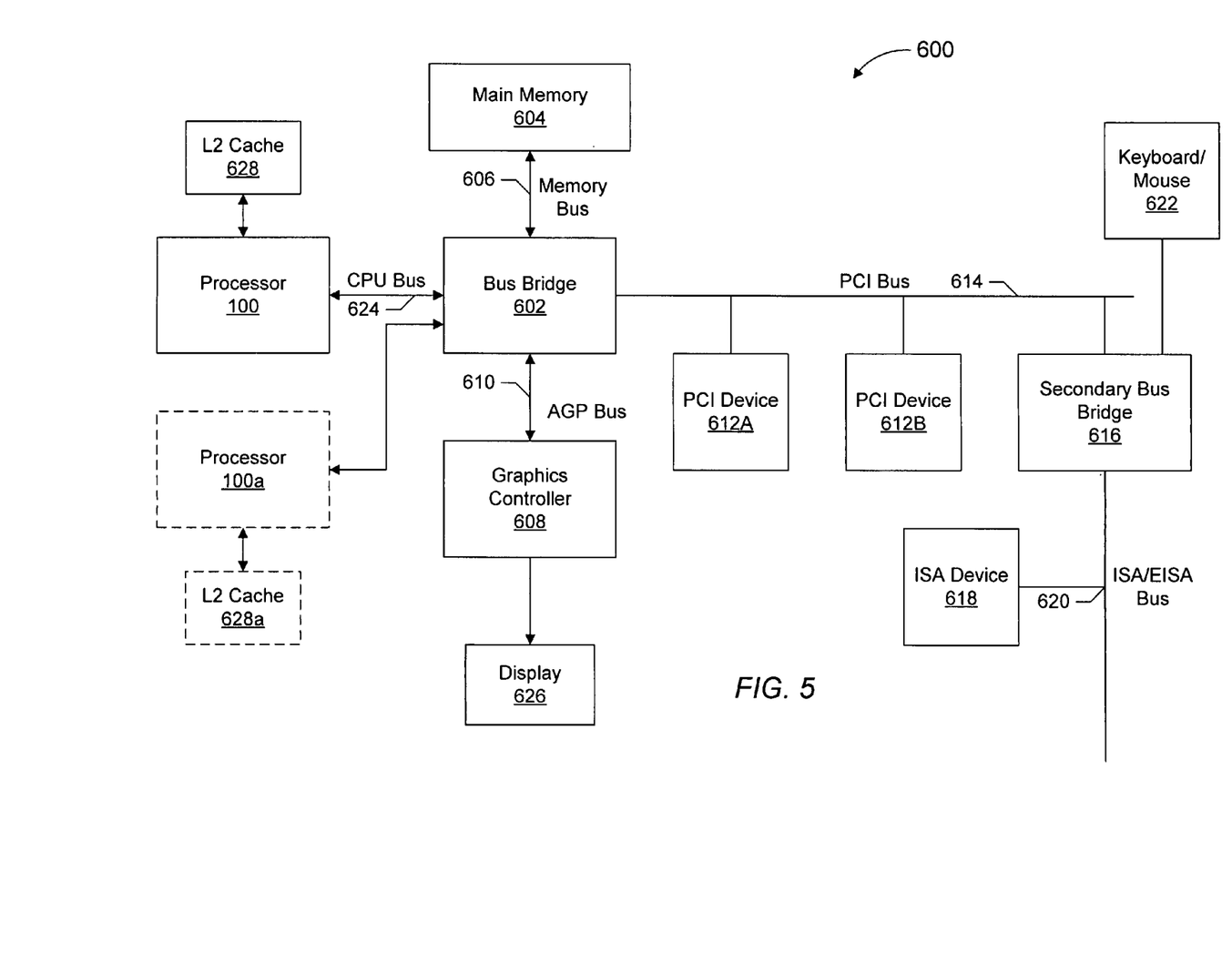
FIG. 5 is a block diagram of one embodiment of a computer system.

Referring to FIG. 5, a block diagram of one embodiment of a computer system is shown. Components that correspond to those illustrated in FIG. 1 are numbered identically for clarity and simplicity. Computer system 600 includes a processor 100 coupled to a variety of system components through a bus bridge 602. Processor 100 may include an embodiment of a trace cache 160 as described above. Computer system 600 also includes a main memory 604 that is coupled to bus bridge 602 through a memory bus 606, and a graphics controller 608 is coupled to bus bridge 602 through an AGP bus 610. Several PCI devices 612A–612B are coupled to bus bridge 602 through a PCI bus 614. A secondary bus bridge 616 may also be provided to accommodate an electrical interface to one or more EISA or ISA devices 618 through an EISA/ISA bus 620. In this example, processor 100 is coupled to bus bridge 602 through a CPU bus 624 and to an optional L2 cache 628. It is noted that in other embodiments, processor 100 may include an integrated L2 cache (not shown).

Bus bridge 602 provides an interface between processor 100, main memory 604, graphics controller 608, and devices attached to PCI bus 614. When an operation is received from one of the devices connected to bus bridge 602, bus bridge 602 identifies the target of the operation (e.g., a particular device or, in the case of PCI bus 614, that the target is on PCI bus 614). Bus bridge 602 routes the operation to the targeted device. Bus bridge 602 generally translates an operation from the protocol used by the source device or bus to the protocol used by the target device or bus.

In addition to providing an interface to an ISA/EISA bus for PCI bus 614, secondary bus bridge 616 may incorporate additional functionality. An input/output controller (not shown), either external from or integrated with secondary bus bridge 616, may also be included within computer system 600 to provide operational support for a keyboard and mouse 622 and for various serial and parallel ports. An external cache unit (not shown) may also be coupled to CPU bus 624 between processor 100 and bus bridge 602 in other embodiments. Alternatively, the external cache may be coupled to bus bridge 602 and cache control logic for the external cache may be integrated into bus bridge 602. L2 cache 628 is shown in a backside configuration to processor 100. It is noted that L2 cache 628 may be separate from processor 100, integrated into a cartridge (e.g., slot 1 or slot A) with processor 100, or even integrated onto a semiconductor substrate with processor 100.

Main memory 604 is a memory in which application programs are stored and from which processor 100 primarily executes. A suitable main memory 604 may include various types of DRAM (Dynamic Random Access Memory). For example, a plurality of banks of SDRAM (Synchronous DRAM) or Rambus DRAM (RDRAM) may be used.

PCI devices 612A–612B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 618 is illustrative of various types of peripheral devices, such as a modem, a sound card, and a variety of data acquisition cards such as GPIB or field bus interface cards.

Graphics controller 608 is provided to control the rendering of text and images on a display 426. Graphics controller 608 may embody a typical graphics accelerator generally known in the art to render three-dimensional data structures that can be effectively shifted into and from main memory 604. Graphics controller 608 may therefore be a master of AGP bus 610 in that it can request and receive access to a target interface within bus bridge 602 to thereby obtain access to main memory 604. A dedicated graphics bus accommodates rapid retrieval of data from main memory 604. For certain operations, graphics controller 608 may further be configured to generate PCI protocol transactions on AGP bus 610. The AGP interface of bus bridge 602 may thus include functionality to support both AGP protocol transactions as well as PCI protocol target and initiator transactions. Display 626 is any electronic display upon which an image or text can be presented. A suitable display 626 includes a cathode ray tube ("CRT"), a liquid crystal display ("LCD"), etc.

Figure 6:
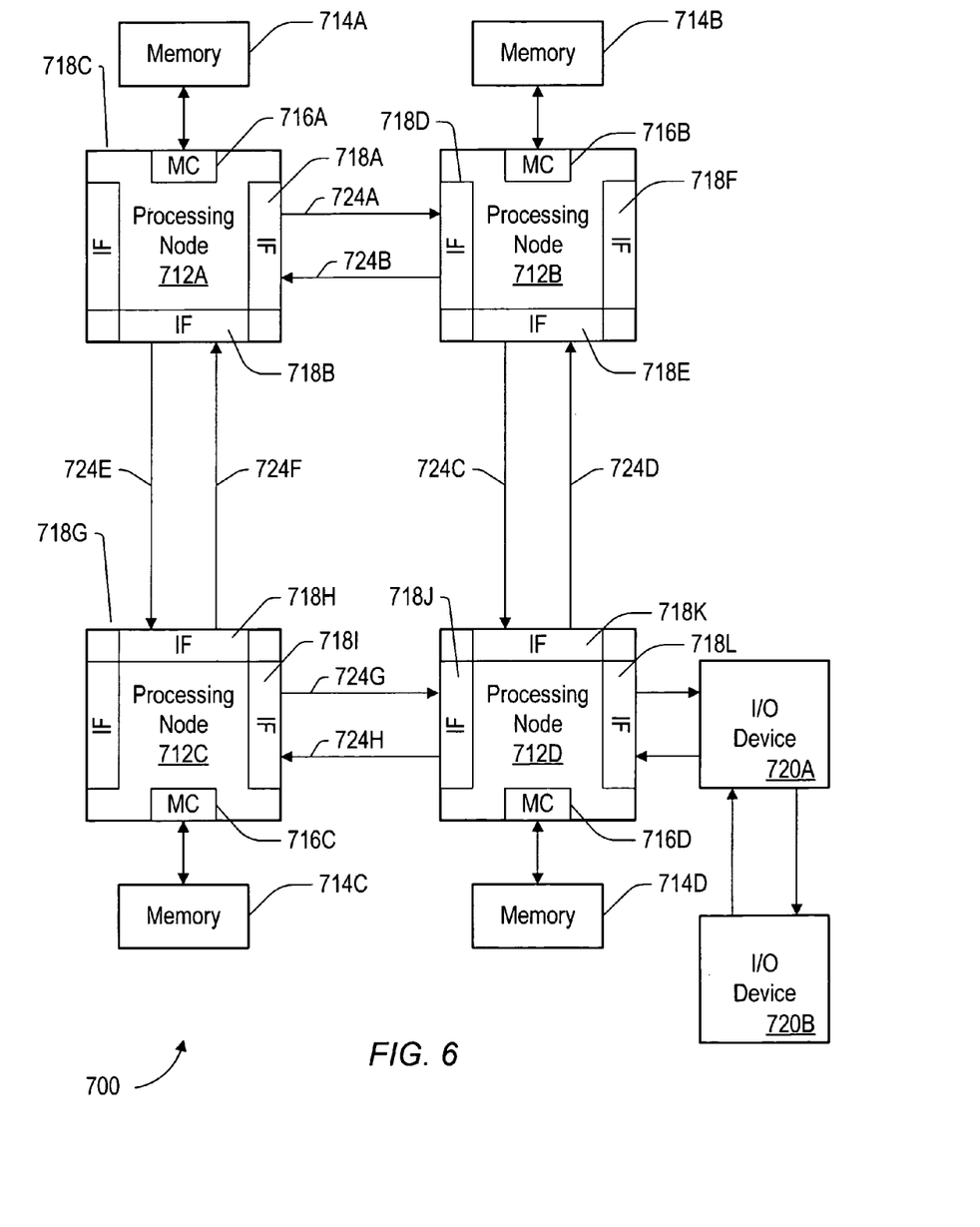
FIG. 6 is a block diagram of one embodiment of another embodiment of a computer system.

It is noted that, while the AGP, PCI, and ISA or EISA buses have been used as examples in the above description, any bus architectures may be substituted as desired. It is further noted that computer system 600 may be a multiprocessing computer system including additional processors (e.g., processor 100a shown as an optional component of computer system 600). Processor 100a may be similar to processor 100. More particularly, processor 100a may be an identical copy of processor 100 in one embodiment. Processor 100a may be connected to bus bridge 602 via an independent bus (as shown in FIG. 6) or may share CPU bus 624 with processor 100. Furthermore, processor 100a may be coupled to an optional L2 cache 628a similar to L2 cache 628.

Turning to FIG. 6, a block diagram of another embodiment of a computer system is shown. Components that correspond to those illustrated in FIG. 1 are numbered identically for clarity and simplicity. Computer system 700 includes several processing nodes 712A, 712B, 712C, and 712D. Each processing node is coupled to a respective memory 714A–714D via a memory controller 716A–716D included within each respective processing node 712A–712D. Additionally, processing nodes 712A–712D include interface logic (IF 718A–L) used to communicate between the processing nodes 712A–712D. For example, processing node 712A includes interface logic 718A for communicating with processing node 712B, interface logic 718B for communicating with processing node 712C, and a third interface logic 718C for communicating with yet another processing node (not shown). Similarly, processing node 712B includes interface logic 718D, 718E, and 718F; processing node 712C includes interface logic 718G, 718H, and 718I; and processing node 712D includes interface logic 718J, 718K, and 718L. Processing node 712D is coupled to communicate with a plurality of input/output devices (e.g., devices 720A–720B in a daisy chain configuration) via interface logic 718L. Other processing nodes may communicate with other I/O devices in a similar fashion.

In the illustrated embodiment, processing nodes 712A–712D implement a packet-based link for inter-processing node communication. The link is implemented as sets of unidirectional lines (e.g., lines 724A are used to transmit packets from processing node 712A to processing node 712B and lines 724B are used to transmit packets from processing node 712B to processing node 712A). Other sets of lines 724C–724H are used to transmit packets between other processing nodes as illustrated in FIG. 7. Generally, each set of lines 724 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 712A to processing node 712D may pass through either processing node 712B or processing node 712C as shown in FIG. 17. Any suitable routing algorithm may be used. Other embodiments of computer system 700 may include more or fewer processing nodes then the embodiment shown in FIG. 7.

Generally, the packets may be transmitted as one or more bit times on the lines 724 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 712A–712D, in addition to a memory controller and interface logic, may include one or more processors. Broadly speaking, a processing node includes at least one processor and may optionally include a memory controller for communicating with a memory and other logic as desired. More particularly, each processing node 712A–712D may include one or more processors such as processor 100 of FIG. 1. As such, each processing node 712A–D may include a trace cache 160 and associated logic as described above in conjunction with the descriptions of FIG. 1 through FIG. 4.

Memories 714A–614D may include any suitable memory devices. For example, a memory 714A–714D may include one or more types of DRAM such as RAMBUS DRAMs (RDRAMs), synchronous DRAMs (SDRAMs), double data rate SDRAM (DDR SDRAM), or static RAM, etc. The address space of computer system 700 may be divided among memories 714A–714D. Each processing node 712A–712D may include a memory map used to determine which addresses are mapped to which memories 714A–714D, and hence to which processing node 712A–712D a memory request for a particular address should be routed. In one embodiment, the coherency point for an address within computer system 700 is the memory controller 716A–716D coupled to the memory storing bytes corresponding to the address. In other words, the memory controller 716A–716D is responsible for ensuring that each memory access to the corresponding memory 714A–714D occurs in a cache coherent fashion. Memory controllers 716A–716D may include control circuitry for interfacing to memories 714A–714D. Additionally, memory controllers 716A–716D may include request queues for queuing memory requests.

Interface logic 718A–718L may include a variety of buffers for receiving packets from the link and for buffering packets to be transmitted upon the link. Computer system 700 may employ any suitable flow control mechanism for transmitting packets. For example, in one embodiment, each interface logic 718 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 720A–720B may be any suitable I/O devices. For example, I/O devices 720A–720B may include devices for communicate with another computer system to which the devices may be coupled (e.g., network interface cards or modems). Furthermore, I/O devices 720A–720B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A processor comprising:
    a trace generator configured to generate a plurality of traces each including one or more operations, wherein said one or more operations are decoded from one or more instructions, wherein each of said one or more operations is associated with a respective address;
    a trace cache memory coupled to said trace generator, wherein said trace cache memory includes a plurality of entries each configured to store one of said plurality of traces;
    wherein said trace generator is further configured to restrict each of said plurality of traces to include only operations having respective addresses that fall within one or more predetermined ranges of contiguous addresses.

2. The processor as recited in claim 1, wherein a starting address of said one or more predetermined ranges of contiguous addresses is based upon said respective address of a given one of said one or more operations within each of said plurality of traces.

3. The processor as recited in claim 1, wherein starting address of said one or more predetermined ranges of contiguous addresses is based upon said respective address of a first operation of said one or more operations within each of said plurality of traces.

4. The processor as recited in claim 2, wherein each of said one or more predetermined ranges of contiguous addresses is separated by a predetermined number of contiguous addresses.

5. The processor as recited in claim 2, wherein said one or more predetermined ranges of contiguous addresses includes a first range of contiguous addresses as determined by said respective address of a given one of said one or more operations and a next N sequential ranges of contiguous addresses, where N is any number.

6. The processor as recited in claim 2, wherein said one or more predetermined ranges of contiguous addresses includes a first range of contiguous addresses as determined by said respective address of a given one of said one or more operations and a next sequential range of contiguous addresses.

7. The processor as recited in claim 1 further comprising a trace cache control unit coupled to said trace cache memory and configured to receive a trace cache probe and to store in a trace cache probe storage, an address corresponding to said trace cache probe until said trace cache probe completes.

8. The processor as recited in claim 7, wherein said trace cache control unit is further configured to determine whether a trace cache probe to a particular address is outstanding in response to receiving a trace cache fetch to said particular address by comparing said particular address to said address corresponding to said trace cache probe stored within said trace cache probe storage.

9. The processor as recited in claim 8, wherein said trace cache control unit is further configured to block said trace cache fetch in response to determining that said trace cache probe to a particular address is outstanding.

10. A method comprising:
    generating a trace including one or more operations decoded from one or more instructions, wherein each of said one or more operations is associated with a respective address;
    storing said trace in a trace cache entry within a trace cache memory;
    restricting said trace to include only operations having respective addresses that fall within one or more predetermined ranges of contiguous addresses.

11. The method as recited in claim 10, wherein a starting address of said one or more predetermined ranges of contiguous addresses is based upon said respective address of a given one of said one or more operations within said trace.

12. The method as recited in claim 10, wherein starting address of said one or more predetermined ranges of contiguous addresses is based upon said respective address of a first operation of said one or more operations within said trace.

13. The method as recited in claim 11, wherein each of said one or more predetermined ranges of contiguous addresses is separated by a predetermined number of contiguous addresses.

14. The method as recited in claim 11, wherein said one or more predetermined ranges of contiguous addresses includes a first range of contiguous addresses as determined by said respective address of a given one of said one or more operations and a next N sequential ranges of contiguous addresses, where N is any number.

15. The method as recited in claim 11, wherein said one or more predetermined ranges of contiguous addresses includes a first range of contiguous addresses as determined by said respective address of a given one of said one or more operations and a next sequential range of contiguous addresses.

16. The method as recited in claim 10 further comprising receiving a trace cache probe and storing in a trace cache probe storage, an address corresponding to said trace cache probe until said trace cache probe completes.

17. The method as recited in claim 16 further comprising in response to receiving a trace cache fetch to a particular address, determining whether a trace cache probe to said particular address is outstanding by comparing said particular address to said address corresponding to said trace cache probe stored within said trace cache probe storage.

18. The method as recited in claim 17 further comprising blocking said trace cache fetch in response to determining that said trace cache probe to a particular address is outstanding.

* * * * *